US010209564B2

United States Patent
Peng et al.

(10) Patent No.: US 10,209,564 B2
(45) Date of Patent: Feb. 19, 2019

(54) BACKLIGHT MODULE WITH POROUS OPTICAL FILM AND A WAVELENGTH CONVERSION LAYER DISPOSED ABOVE A LIGHT SOURCE WHERE THE OPTICAL FILM HAS A PLURALITY OF LIGHT EMISSION STRUCTURES

(71) Applicant: AU OPTRONICS CORPORATION, Hsin-chu (TW)

(72) Inventors: Kaung-Jay Peng, Hsin-chu (TW); Ming-Lung Chen, Hsin-chu (TW); Ming-Chun Hsu, Hsin-chu (TW); Chih-Kai Wang, Hsin-chu (TW); Chung-Ting Chen, Hsin-chu (TW); Ming-Cheng Wang, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 58 days.

(21) Appl. No.: 15/398,009

(22) Filed: Jan. 4, 2017

(65) Prior Publication Data

US 2017/0285408 A1  Oct. 5, 2017

(30) Foreign Application Priority Data

Mar. 29, 2016 (TW) .............................. 105109839 A

(51) Int. Cl.
*G02F 1/1335* (2006.01)
(52) U.S. Cl.
CPC .. *G02F 1/133611* (2013.01); *G02F 1/133603* (2013.01); *G02F 2001/133614* (2013.01); *G02F 2202/36* (2013.01)
(58) Field of Classification Search
CPC ......... G02F 1/133611; G02F 1/133603; G02F 2001/133614
See application file for complete search history.

(56) References Cited

U.S. PATENT DOCUMENTS 7,036,956 B1    5/2006  Chou
7,858,408 B2   12/2010  Mueller et al.
(Continued)

FOREIGN PATENT DOCUMENTS

CN   1648741 A   8/2005
CN   1777999 A   5/2006
(Continued)

OTHER PUBLICATIONS

Office Action issued by (TIPO) Intellectual Property Office, Ministry of Economic Affairs, R. O. C. dated Sep. 22, 2017 for Application No. 105109839, Taiwan.
(Continued)

*Primary Examiner* — Robert J May
(74) *Attorney, Agent, or Firm* — Tim Tingkang Xia, Esq.; Locke Lord LLP

(57) ABSTRACT

A backlight module including a substrate, a light source, a porous optical film, and a wavelength conversion optical layer is provided. The light source is located on the substrate. The porous optical film is disposed over the light source and has a plurality of emission structures, and the porous optical film distributes light generated by the light source to be emitted through the emission structures located at different positions of the porous optical film. The porous optical film has a central region and a peripheral region surrounding the central region, the central region is disposed corresponding to the light source, and an area of the central portion is A. The wavelength conversion optical layer is located between the light source and the porous optical film, and a vertical projection area of the wavelength conversion optical film is B, where $0.49 \leq A/B \leq 5$.

15 Claims, 15 Drawing Sheets

(56) References Cited

U.S. PATENT DOCUMENTS

| | | |
|---|---|---|
| 9,482,897 B2 | 11/2016 | Kim et al. |
| 9,696,585 B2 | 7/2017 | Wang et al. |
| 9,904,105 B2 | 2/2018 | Ma et al. |
| 2005/0194884 A1 | 9/2005 | Liu |

FOREIGN PATENT DOCUMENTS

| | | |
|---|---|---|
| CN | 101118345 B | 2/2008 |
| CN | 102317680 A | 1/2012 |
| CN | 102330914 A | 1/2012 |
| CN | 102460748 A | 5/2012 |
| CN | 202432456 U | 9/2012 |
| CN | 102855826 A | 1/2013 |
| CN | 103547858 A | 1/2014 |
| CN | 103939793 A | 7/2014 |
| CN | 104330921 A | 2/2015 |
| CN | 104344291 A | 2/2015 |
| CN | 105068314 A | 11/2015 |
| TW | 200528838 A | 9/2005 |
| TW | 200951567 A | 12/2009 |
| TW | 201413348 A | 4/2014 |
| WO | 2005068899 A1 | 7/2005 |

OTHER PUBLICATIONS

Office Action issued by the State Intellectual Property Office of the Peoples Republic of China dated Jul. 17, 2018 for Application No. CN201610409981.4.

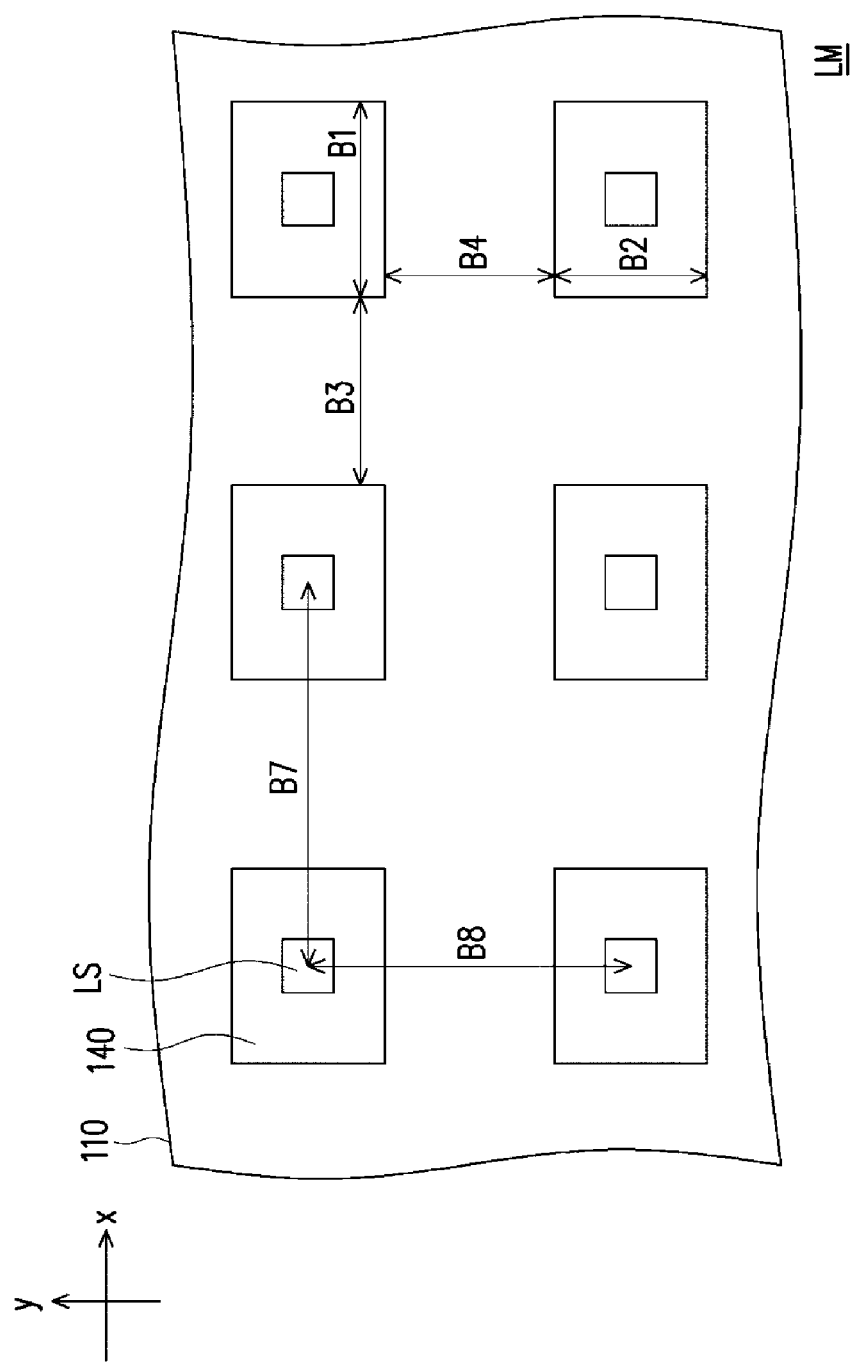

BACKLIGHT MODULE WITH POROUS OPTICAL FILM AND A WAVELENGTH CONVERSION LAYER DISPOSED ABOVE A LIGHT SOURCE WHERE THE OPTICAL FILM HAS A PLURALITY OF LIGHT EMISSION STRUCTURES

CROSS-REFERENCE TO RELATED PATENT APPLICATION

This application claims the benefit of priority to Taiwan Patent Application No. 105109839, filed Mar. 29, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a backlight module, and more specifically to a backlight module having improved brightness uniformity.

BACKGROUND

A liquid crystal display usually comprises a liquid crystal panel and a backlight module, wherein the backlight module mainly functions to provide a surface light source required for the liquid crystal panel to display. Generally, depending on the position of the light source, the backlight module can be divided into direct type and edge-lit type. The light source of the direct type backlight module is disposed directly below the backlight module, usually for a liquid crystal display of large size, and the light source of the edge-lit type backlight module is disposed at a side of the backlight module, usually for a liquid crystal display of small size.

In order to prevent non-uniform brightness formed on a liquid crystal display, an optical film is generally used to uniformize the brightness of the entire images and to maintain the entire images brightness without compromising the light source brightness. Optical films are mainly used in the existing technology to achieve the purpose of light uniformization and concentration. However, phenomena such as deformation (shrinkage) of an optical film and blue light leakage caused by the disposition of the optical film and the light source and the distance therebetween all result in poor brightness uniformity of images in the existing methods. Therefore, how to maintain the brightness uniformity of images is the theme for researching at present.

SUMMARY

The present invention provides a backlight module to improve brightness uniformity of a liquid crystal display.

The backlight module of the present invention includes a substrate, a light source, a porous optical film, and a wavelength conversion optical layer. The light source is located on the substrate. The porous optical film is disposed above the light source and has a plurality of emission structures, wherein the porous optical film distributes light generated by the light source to be emitted through the emission structures located at different positions; the porous optical film has a central region and a peripheral region surrounding the central region; the central region is disposed corresponding to the light source, and an area of the central region is A. The wavelength conversion optical layer is located between the light source and the porous optical film, and a vertical projection area of the wavelength conversion optical layer is B, where $0.49 \leq A/B \leq 5$.

Based on the above, the backlight module of the present invention includes the porous optical film having the area A of the central region and the wavelength conversion optical layer having the vertical projection area B, in which the backlight module satisfies the condition $0.49 \leq A/B \leq 5$, so that brightness uniformity of display frames can be improved.

To make the above characteristics and advantages of the present disclosure clearer and easier to understand, the following embodiments are described in detail in conjunction with accompanying figures.

BRIEF DESCRIPTION OF THE DRAWINGS

FIG. 13 is a schematic top view of a light source matrix of a backlight module according to an embodiment of the present invention.

DETAILED DESCRIPTION

Figure 1:
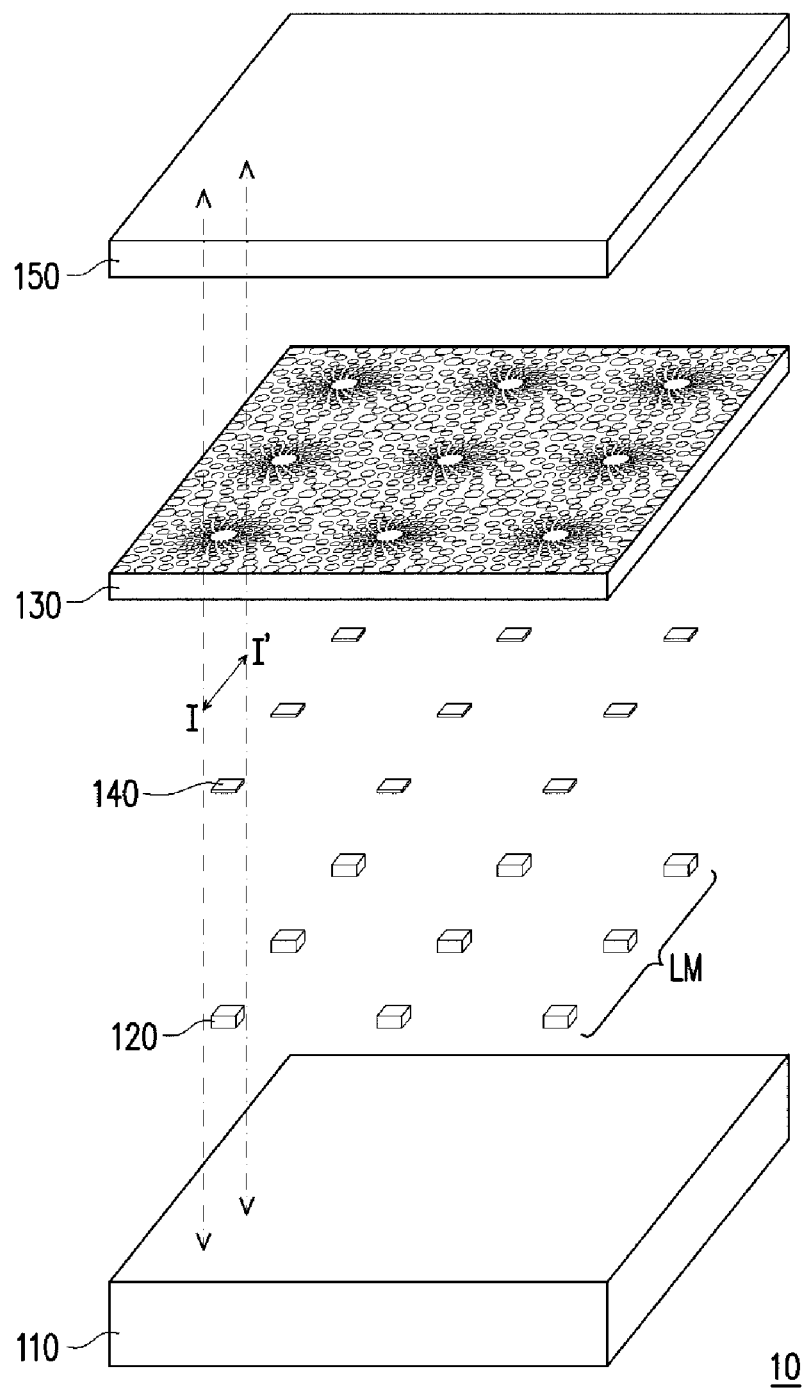
FIG. 1 is a schematic exploded view of a backlight module according to an embodiment of the present invention.
Figure 2A:
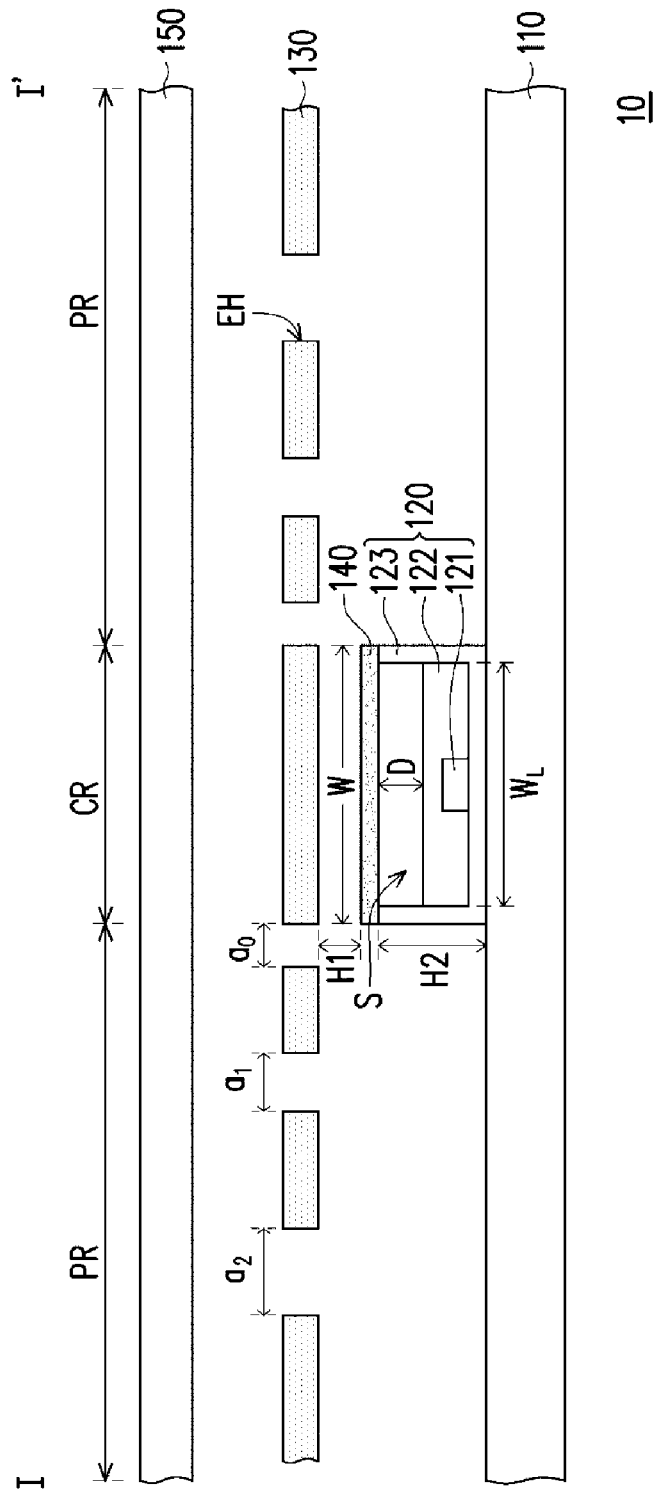
FIG. 2A is a schematic cross-sectional view along a section line I-I' of the backlight module in FIG. 1.
Figure 2B:
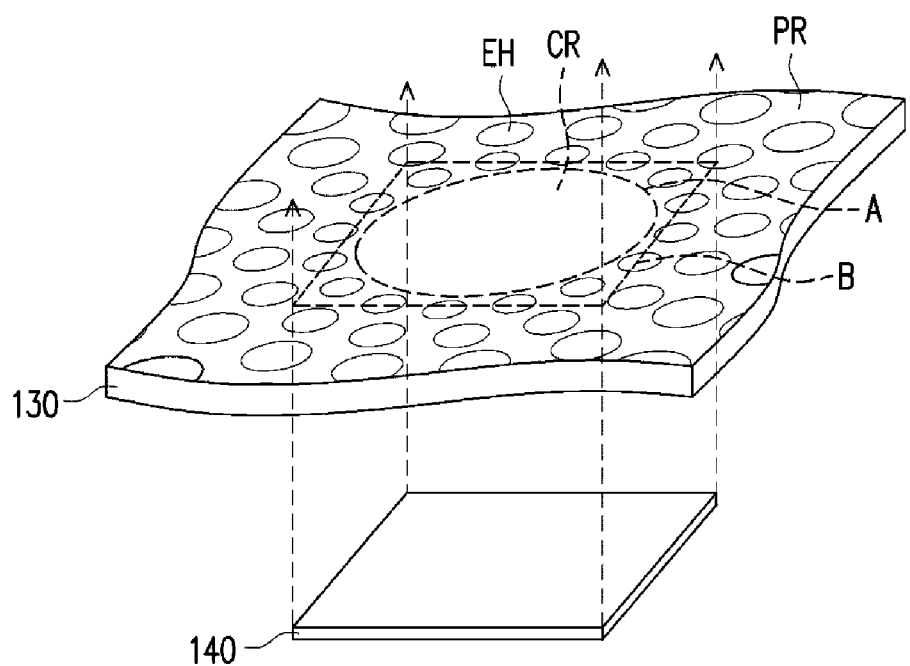
FIG. 2B is a schematic exploded view of a porous optical film and a wavelength conversion optical layer of the backlight module in FIG. 1.

FIG. 1 is a schematic exploded view of a backlight module according to an embodiment of the present invention. FIG. 2A is a schematic cross-sectional view along a section line I-I' of the backlight module in FIG. 1. FIG. 2B is a schematic exploded view of a porous optical film and a wavelength conversion optical layer of the backlight module in FIG. 1. Please refer to both FIG. 1 and FIG. 2A. A backlight module 10 in the present embodiment includes a substrate 110, a light source 120, a wavelength conversion optical layer 130, and a porous optical film 140, and the backlight module 10 may further include a diffusion film 150. In the present embodiment, relative positional relationships among the above elements are described by using a single light source 120 as an example. However, it should be noted that the backlight module 10 substantially includes a light source matrix LM formed by multiple light sources 120 arranged on the substrate 110 of the backlight module 10. The detailed structure of the light source matrix LM will be described in the subsequent paragraphs. In addition, the backlight module 10 also includes a metal backplate, a frame, and a circuit control system (not depicted). The light sources 120 are driven by the circuit control system. A person skilled in the art may perform the setting via a common means according to needs; and therefore, relevant description is not given herein in the present invention.

Please first refer to FIG. 1 and FIG. 2A. The light source 120 is located on the substrate 110. In the present embodiment, the light source 120 includes, for example, a blue light chip 121, a packaging adhesive 122, and a cup-shaped structure 123. The cup-shaped structure 123 is disposed on the substrate 110 and has an accommodation space S. The blue light chip 121 is disposed within the accommodation space S. The packaging adhesive 122 is located within the accommodation space S to cover the blue light chip 121, so as to package the blue light chip 121 in the cup-shaped structure 123. A refractive index of the packaging adhesive 122 in the present embodiment may be 1.4-1.8. A material of the packaging adhesive 122 is, for example, a main material such as silica gel, resin, or glass, wherein the main material may be filling with diffusion particles. A material of the diffusion particles is, for example, powder such as $SiO_2$, $Mg(OH)_2$, $CaCO_3$, $BaSO_4$, $Al_2O_3$, or $TiO_2$. However, the structure of the light source 120 of the present invention is not limited thereto. In other embodiments, the light source 120 may also have a lens structure or other common configurations.

As shown in FIG. 1, FIG. 2A, and FIG. 2B, the porous optical film 130 is disposed above the light source 120 and has a plurality of emission structures EH. The porous optical film 130 has a central region CR and a peripheral region PR surrounding the central region CR, wherein the emission structures EH are disposed in the peripheral region PR, and the central region CR of the porous optical film 130 is disposed corresponding to the light source 120 and does not have emission structures EH. Please refer to FIG. 1. In the present embodiment, apertures of the emission structures EH become, for example, larger in an extension direction from the central region CR toward the peripheral region PR, i.e., $a_2 > a_1 > a_0$; however, the present invention is not limited thereto. In another embodiment, the apertures of the emission structures EH are, for example, apertures having the same size. In addition, perforations of the emission structures EH may have a shape of a cone, a cylinder, a trapezoid, or the like. Accordingly, light generated by the light source 120 may be distributed by the porous optical film 120 to the emission structures EH located at different positions and be emitted therethrough, so that dot light-emitting of the light source 120 can be changed to surface emission, facilitating brightness uniformization of the backlight module 10.

Please still refer to FIG. 1 and FIG. 2A. The wavelength conversion optical layer 140 is located between the light source 120 and the porous optical film 130, and is disposed corresponding to the light source 120. In the present embodiment, the wavelength conversion optical layer 140 is disposed on the cup-shaped structure 123 of the light source 120, so as to close the accommodation space S by the wavelength conversion optical layer 140. The accommodation space S not filled with the packaging adhesive 122 is, for example, filled with air or vacuumed, and the present invention is not limited thereto. In addition, the wavelength conversion optical layer 140 has a width W, and the accommodation space S in the cup-shaped structure 123 has a width $W_L$, wherein $1 \leq (W/W_L) < 6$, and more preferably, $1 \leq (W/W_L) < 3$. Accordingly, the backlight module 10 in the present embodiment not only can effectively reduce a disposition area of the wavelength conversion optical layer 140 and therefore to lower manufacturing costs of the backlight module 10, but also can reduce blue light leakage and so on.

In addition, a gap between the light source 120 and the wavelength conversion optical layer 140 is a distance D, wherein 10 mm > D ≥ 0.75 mm. Please refer to FIG. 2A again. Specifically, a gap (namely, the accommodation space S) is provided between the packaging adhesive 122 of the light source 120 and the wavelength conversion optical layer 140. Because of the presence of the gap, a distance D exists between the packaging adhesive 122 covering the blue light chip 121 in the light source 120 and the wavelength conversion optical layer 140. In other words, the distance D exists between the packaging adhesive 122 of the light source 120 and the wavelength conversion optical layer 140, as shown in FIG. 2A. With the distance of the gap, not only that the backlight module 10 keeps a thin appearance, but the backlight module 10 also reduces the influence of the heat generated by the light source 120 on the wavelength conversion optical layer 140, thereby prolonging the life time of the wavelength conversion optical layer 140 and reducing heat degradation. In an embodiment, a material of the wavelength conversion optical layer 140 includes quantum dots as a base material or a phosphor material. The quantum dots of the wavelength conversion optical layer 140 are, for example, cadmium selenide/zinc sulfide (CdSe/ZnS) or a material having similar characteristics. In the wavelength conversion optical layer 140, a main material as the quantum dots material may be, for example, a material such as polycarbonate, polymethylmethacrylate, acrylonitrile-butadiene-styrene resin, polyethylene terephthalate, epoxy resin, or glass. In addition, the wavelength conversion optical layer 140 may be used in combination with diffusion particles such as titanium dioxide ($TiO_2$) or aluminum oxide ($Al_2O_3$) to improve diffusivity.

Please refer to FIG. 2B. An area of the central region CR of the porous optical film 130 of the backlight module 10 in the present embodiment is A, and the area A corresponds to the position of the central region CR. The wavelength conversion optical layer 140 has a vertical projection area of B, wherein the backlight module 10 satisfies the following condition: $0.49 \leq (A/B) \leq 5$. Accordingly, the backlight module 10 in the present embodiment may be used for uniformizing the brightness of display images, and at the same time, reducing non-uniform color caused by problems such as mura or blue light leakage. In addition, a distance H1 exists between the wavelength conversion optical layer 140 and the porous optical film 120; and a distance H2 exists between the wavelength conversion optical layer 140 and the substrate 110, wherein $0 < (H1/H2) < 6$, a maximum of a sum of H1 and H2 is 10 mm, and H1 cannot be 0. Therefore, the backlight module 10 in the present embodiment not only keeps a thin appearance but also achieves a desirable light mixing effect.

As shown in FIG. 1 and FIG. 2A, the backlight module 10 in the present embodiment may further include a diffusion film 150 to achieve the purpose of light uniformization and concentration. The porous optical film 130 is located between the diffusion film 150 and the wavelength conversion optical layer 140. The present embodiment uses one diffusion film 150 as an example, but multiple diffusion films may also exist. The present invention is not limited thereto. In another embodiment, one or more diffusion films may also be disposed between the wavelength conversion optical layer 140 and the porous optical film 130. In another embodiment, an optical film such as a brightness enhancement film, a dual brightness enhancement film, or a microlens sheet may also be used in place of the diffusion film 150; or the layers may be used in combination, and the present invention is not limited thereto. In another embodiment, one reflection plate (not depicted) may further be disposed between the substrate 110 and the light source 120 to improve luminous efficiency.

Based on the above, an area of the central region CR of the porous optical film 130 included in the backlight module 10, shown in FIG. 1 and FIG. 2A, is A; and a vertical projection area of the wavelength conversion optical layer 140 is B, wherein the backlight module 10 satisfies the following condition: $0.49 \leq (A/B) \leq 5$. Therefore, the backlight module 10 may be used for uniformizing the brightness of display images, and at the same time, reducing the problem of mura.

Figure 3:
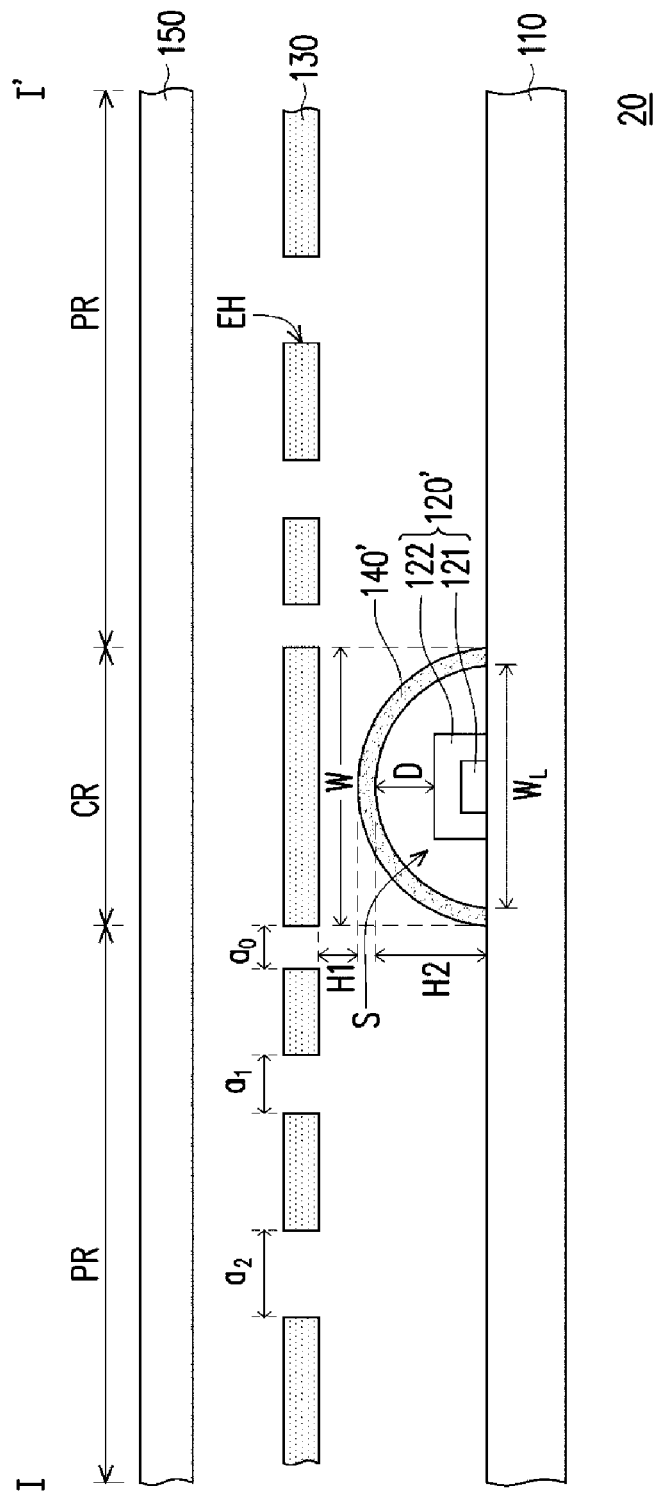
FIG. 3 is a partial schematic cross-sectional view of a backlight module according to another embodiment of the present invention.

FIG. 3 is a partial schematic cross-sectional view of a backlight module 20 according to another embodiment of the present invention. The backlight module 20 in FIG. 3 is similar to that in FIG. 2A; the same or similar elements are indicated by the same or similar reference numerals and they will not be described again herein. The difference between the structure of the embodiment in FIG. 3 and the structure of the embodiment in FIG. 2A lies in that the light source 120 and the wavelength conversion optical layer 140 in FIG. 2A are replaced by a light source 120' and a wavelength conversion optical layer 140' in FIG. 3. As shown in FIG. 3, the light source 120' includes the blue light chip 121 and the packaging adhesive 122 covering the blue light chip 121. The wavelength conversion optical layer 140' has a hemispheric shape and encircles the entire light source 120' and seals the light source 120' on the substrate 110. In other words, the wavelength conversion optical layer 140' forms the accommodation space S for accommodating the light source 120'; that is, the wavelength conversion optical layer 140' encircles the entire light source 120'. A distance D exists between the packaging adhesive 122 covering the blue light chip 121 in the light source 120' and the wavelength conversion optical layer 140' so that a gap between the wavelength conversion optical layer 140' and the light source 120' may be a vacuum environment or filled with air, a packaging adhesive, or the like, and it is not limited to the description herein.

Figure 4:
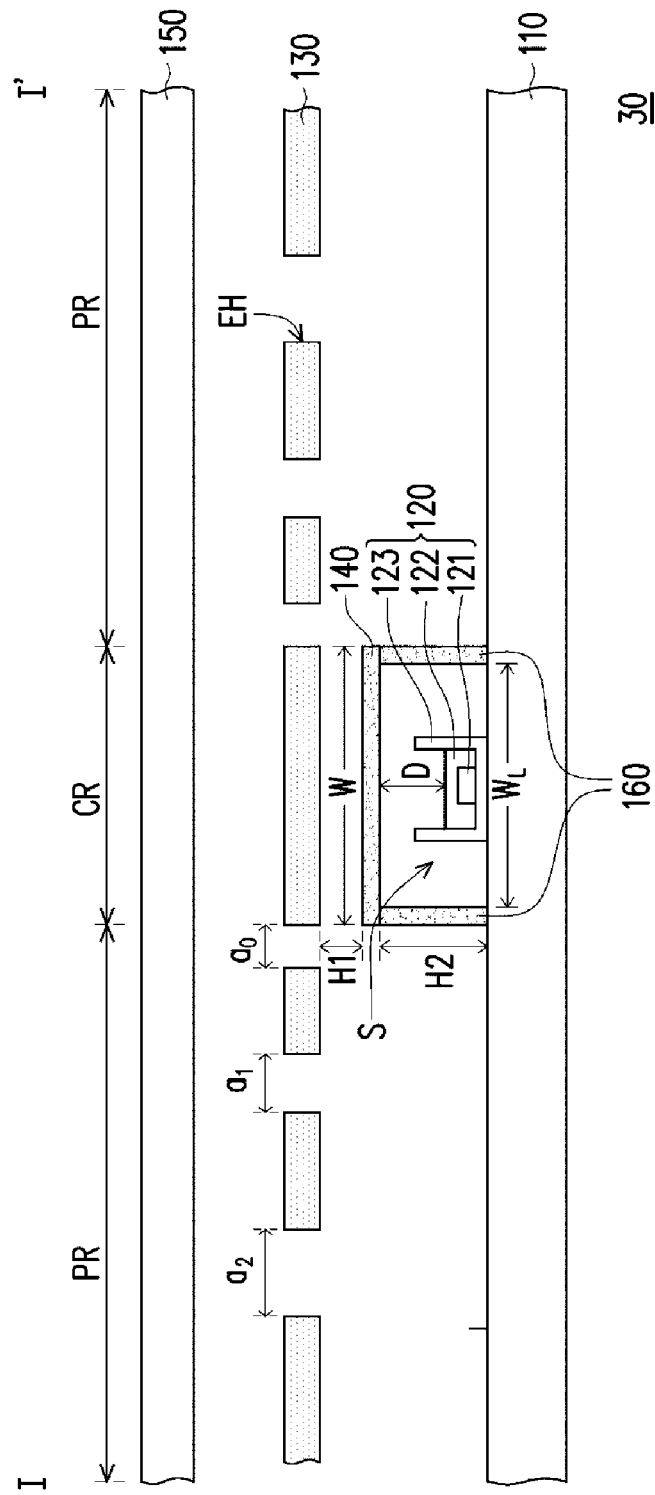
FIG. 4 is a partial schematic cross-sectional view of a backlight module according to another embodiment of the present invention.

FIG. 4 is a partial schematic cross-sectional view of a backlight module 30 according to another embodiment of the present invention. The backlight module 30 in FIG. 4 is similar to that in FIG. 2A; the same or similar elements are indicated by the same or similar reference numerals and they will not be described again herein. The difference between the structure of the embodiment in FIG. 4 and the structure of the embodiment in FIG. 2A lies in that FIG. 4 further includes a supporting frame 160. The supporting frame 160, disposed on the substrate 110, surrounds the light source 120 and carries the wavelength conversion optical layer 140, so that the wavelength conversion optical layer 140 closes an opening of the supporting frame 160. As shown in FIG. 4, the light source 120 is disposed within the accommodation space S defined by the substrate 110, the wavelength conversion optical layer 140, and the supporting frame 160 via the disposition modes of the wavelength conversion optical layer 140 and the supporting frame 160. In an embodiment, the supporting frame 160 is, for example, a material having a high reflectivity (the reflectivity is greater than 80%); and therefore, light emitted by the light source 120 may be continuously reflected within the accommodation space S to effectively improve the light output rate.

Figure 5:
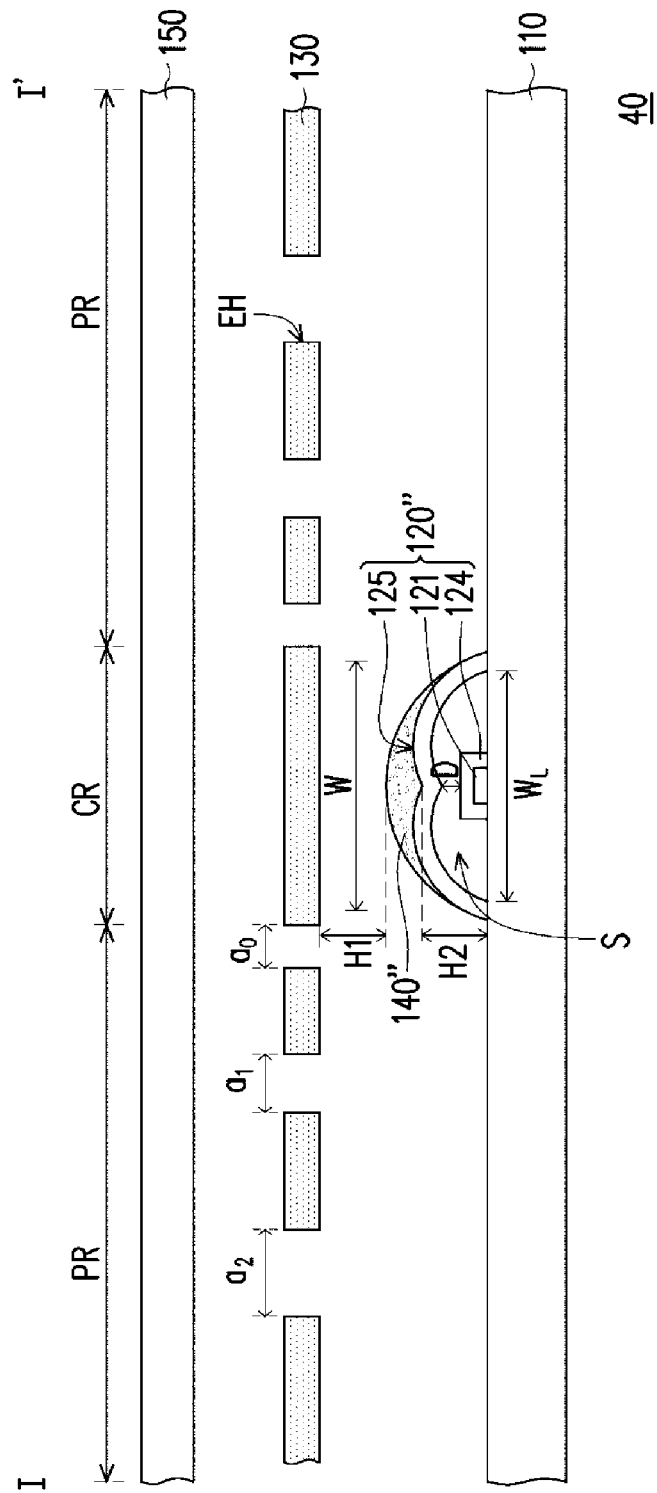
FIG. 5 is a partial schematic cross-sectional view of a backlight module according to another embodiment of the present invention.

FIG. 5 is a partial schematic cross-sectional view of a backlight module 40 according to another embodiment of the present invention. The backlight module 40 in FIG. 5 is similar to that in FIG. 2A; the same or similar elements are indicated by the same or similar reference numerals and they will not be described again herein. The difference between the structure of the embodiment in FIG. 5 and the structure of the embodiment in FIG. 2A lies in that the light source 120 and the wavelength conversion optical layer 140 in FIG. 2A are replaced by a light source 120" and a wavelength conversion optical layer 140" in FIG. 5. As shown in FIG. 5, the light source 120" includes the blue light chip 121, the packaging adhesive 122 covering the blue light chip 121, and a lens 124 covering the packaging adhesive 122. In the present embodiment, the lens 124 is disposed on the substrate 110 and forms an accommodation space S, wherein the blue light chip 121 and the packaging adhesive 122 covering the blue light chip 121 are located within the accommodation space S. In addition, the lens 124 has a recess 125 on an outer side, and the recess 125 is disposed correspondingly to the blue light chip 121. According to the structure, the wavelength conversion optical layer 140" is disposed within the recess 125 and located above the light source 120".

Similar to the backlight module 10 in FIG. 2A and based on the above description, the wavelength conversion optical layers 140/140'/140" in the backlight modules of FIG. 3 to FIG. 5 have a width W; the accommodation space S has a width $W_L$, and $1 \leq (W/W_L) < 6$. The backlight modules in the foregoing embodiments, therefore, not only can effectively reduce a disposition area of the wavelength conversion optical layers 140/140'/140" and thus to lower manufacturing costs, but they can also reduce blue light leakage and so on. In addition, in the foregoing backlight modules, a distance D exists between the packaging adhesive 122 of the light sources 120/120'/120" and the wavelength conversion optical layers 140/140'/140", and 10 mm>D≥0.75 mm. With the distance of the gap, not only that the backlight modules keep a thin appearance, but the backlight modules also reduce the influence of the heat generated by the light sources 120/120'/120" on the wavelength conversion optical layers 140/140'/140", thereby prolonging the service life of the wavelength conversion optical layer 140/140'/140" and reducing heat degradation. Moreover, a distance H1 exists between the wavelength conversion optical layers 140/140'/140" and the porous optical film 130; a distance H2 exists between the wavelength conversion optical layers 140/140'/140" and the substrate 110, and 0<(H1/H2)<6, a maximum of a sum of H1 and H2 is 10 mm, and H1 cannot be 0. Therefore, the backlight modules in the foregoing embodiments have a thin appearance; additionally, they achieve a desirable light mixing effect.

It should be noted that an area of the central region CR of the porous optical film 130 in the backlight modules in FIG.

3 to FIG. 5 is A; and a vertical projection area of the wavelength conversion optical layers 140/140'/140" is B, wherein the following condition is satisfied: 0.49≤(A/B)≤5. Therefore, the backlight modules in FIG. 3, FIG. 4, and FIG. 5 may be used for uniformizing the brightness of display frames; and at the same time, reducing non-uniform color caused by problems such as mura or blue light leakage.

Figure 6:
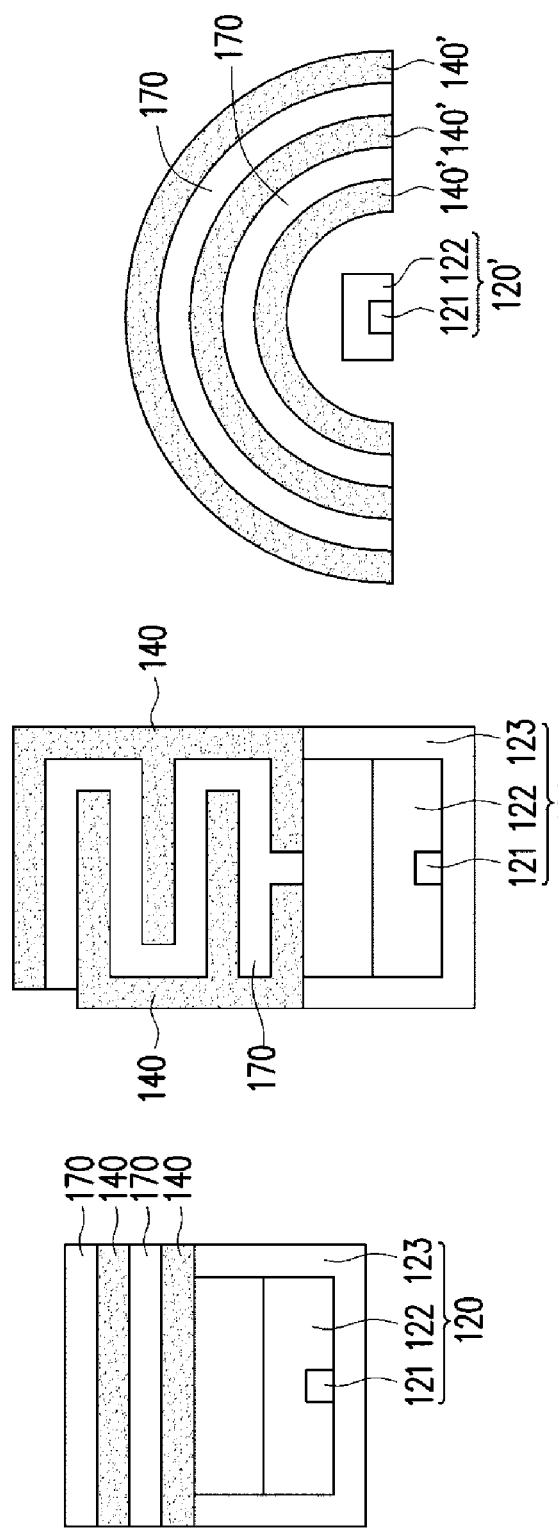
FIG. 6A to FIG. 6C are schematic cross-sectional views of other aspects of the wavelength conversion optical layer in the present invention.

In the aforementioned embodiments, the wavelength conversion optical layer in the present invention has, for example, a planar surface (for example, the wavelength conversion optical layer 140) or a curved surface (for example, the wavelength conversion optical layers 140'/140"); and both uses the configuration of a single wavelength conversion optical layer as an example. The present invention, however, is not limited thereto. The wavelength conversion optical layer in the present invention may have a variety of different designs based on needs. FIG. 6A to FIG. 6C are schematic cross-sectional views of other aspects of the wavelength conversion optical layer in the present invention. For example, as shown in FIG. 6A to FIG. 6C, the wavelength conversion optical layer in the present invention may also be formed by stacking multiple wavelength conversion optical layers 140 through intermediate layers 170 (for example, a columnar-shaped stacked structure shown in FIG. 6A or a comb-shaped stacked structure shown in FIG. 6B); or the wavelength conversion optical layer can be formed by stacking multiple wavelength conversion optical layers 140' through intermediate layers 170 (for example, a semicircular stacked structure shown in FIG. 6C). In an embodiment, the intermediate layer 170 is, for example, a glass film layer, an air layer, or a vacuum layer; and the present invention is not limited thereto.

Figure 7:
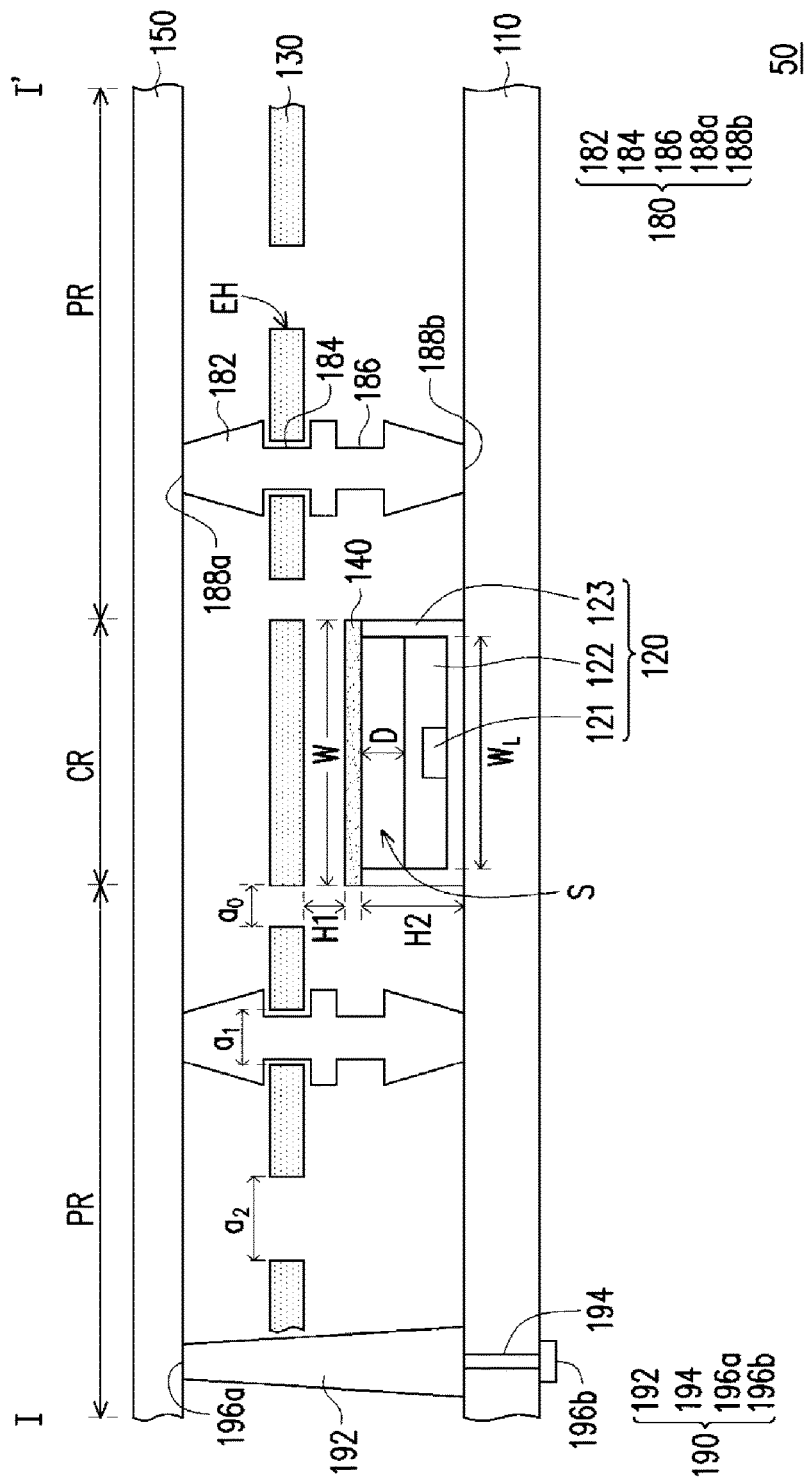
FIG. 7 is a partial schematic cross-sectional view of a backlight module according to another embodiment of the present invention.

FIG. 7 is a partial schematic cross-sectional view of a backlight module 50 according to another embodiment of the present invention. The backlight module 50 in FIG. 7 is similar to that in FIG. 2A; the same or similar elements are indicated by the same or similar reference numerals and they will not be described again herein. The difference between the structure of the embodiment in FIG. 7 and the structure of the embodiment in FIG. 2A lies in that FIG. 7 further includes at least one first supporting member 180 and at least one second supporting member 190.

Figure 8B:
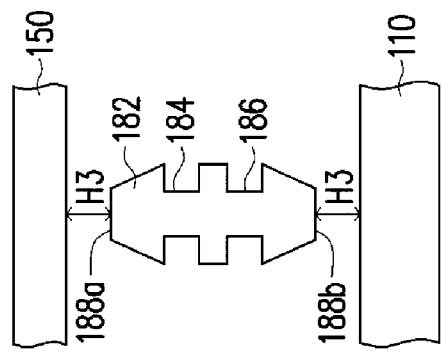
FIG. 8A and FIG. 8B are schematic cross-sectional views of a first supporting member in the present invention.
Figure 8A:
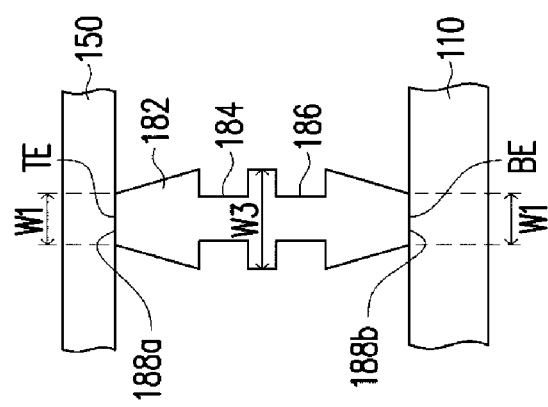

Please refer to FIG. 7. The first supporting member 180 is disposed on the substrate 110 and is located on both sides of the light source 120. The first supporting member 180 has a first supporting pin 182, a first clamping portion 184, and a second clamping portion 186, wherein the first clamping portion 184 and the second clamping portion 186 are disposed on the first supporting pin 182, and are separated from each other. Specifically, a top end 188a and a bottom end 188b of the first supporting pin 182 abut against the diffusion film 150 and the substrate 110 respectively (as shown in FIG. 7 and FIG. 8A); and the first clamping portion 184 clamps the porous optical film 130. Please refer to FIG. 8A first. A shape of the first supporting pin 182 in the present embodiment is, for example, a spindle shape. The top end 188a and the bottom end 188b of the first supporting pin 182 have widths W1 and W2 respectively. Some parts of the first supporting pin 182 located between the first clamping portion 184 and the second clamping portion 186 have a width W3, wherein W1<W3, W2<W3, and W1 may be the same as or different from W2. so as to reduce contact areas between the top end 188a and the bottom end 188b of the first supporting pin 182 and the diffusion film 150 and the substrate 110 can therefore be reduced respectively, and thereby reducing element loss of the backlight module 50 caused by friction. In addition, compared with the materials of the substrate 110 and the diffusion film 150, a material of the top end 188a and the bottom end 188b of the first supporting pin 182 is a material having lower rigidity, so as to reduce scratches produced by friction of the top end 188a and the bottom end 188b on the substrate 110 and/or the diffusion film 150 (or other layers in contact with the top end 188a and the bottom end 188b). However, it should be noted that the fact that the top end 188a and the bottom end 188b of the first supporting pin 182 must abut against the diffusion film 150 and the substrate 110 respectively does not limit the present invention. In another embodiment, a distance H3 exists between the top end 188a and the bottom end 188b of the first supporting pin 182 and the diffusion film 150 and the substrate 110 respectively, as shown in FIG. 8B. The first supporting member 180 is disposed in a suspended manner (that is, H3 is not equal to 0). In other words, the top end 188a and the bottom end 188b of the first supporting member 180 in the present invention are not fixed to other elements of the backlight module 50. Therefore, when the backlight module 50 is in a high-temperature and high-humidity environment, even with a slight deformation, the porous optical film 130, does not bend (shrink) because of the sliding of the first supporting member 180. Moreover, with the specific shape and material of the first supporting member 180, loss caused by friction between the first supporting member 180 and other elements of the backlight module 50 can be effectively reduced.

Please refer to FIG. 7 again. The second supporting member 190, disposed on the substrate 110, has a second supporting pin 192 and a third clamping portion 194. A top end 196a of the second supporting pin 192 abuts against the diffusion film 150. The third clamping portion 194 is located on a bottom end 196b of the second supporting member 190 and is fixedly held in the substrate 110. The second supporting member 190 may thereby serve as a spacer between the diffusion film 150 and the substrate 110 to support the diffusion film 150 and the substrate 110, preventing the backlight module 50 from deformation under pressure. In an embodiment, in a boundary region closest to a cutting edge of the porous optical film 130 (having a distance less than 2 CM from the cutting edge) a configuration density of the first supporting member 180 is D1; and a configuration density of the first supporting member 180 in other remaining regions is D2, wherein D1≥D2. In addition, a configuration density of the second supporting member 190 in a boundary region is D3, wherein D1≥D3.

Moreover, similar to the backlight module 10 in FIG. 2A, the wavelength conversion optical layer 140 in the backlight module 50 of FIG. 7 has a width W; the accommodation space S has a width $W_L$, and $1 \le (W/W_L) < 6$. The backlight module 50, therefore, not only can effectively reduce a disposition area of the wavelength conversion optical layer 140 and thus to lower manufacturing costs, but the backlight module can also reduce blue light leakage and so on. In addition, a distance D exists between the packaging adhesive 122 of the light source 120 and the wavelength conversion optical layer 140, and 10 mm>D≥0.75 mm. With the distance of the gap, not only that the backlight module 50 keeps a thin appearance, but the backlight module 50 also reduces the influence of the heat generated by the light source 120 on the wavelength conversion optical layer 140, thereby prolonging the service life of the wavelength conversion optical layer 140 and reducing heat degradation. In addition, a distance H1 exists between the wavelength conversion optical layer 140 and the porous optical film 130; and a distance H2 exists between the wavelength conversion optical layer 140 and the substrate 110, and 0<(H1/H2)<6, a maximum of a sum of H1 and H2 is 10 mm, and H1 is cannot be 0. Therefore, the backlight module 50 has a desirable light mixing effect. It should be noted that an area of the central region CR of the porous optical film 130 in the backlight module 50 in FIG. 7 is A; and a vertical projection area of the wavelength conversion optical layer 140 is B, wherein the following condition is satisfied: 0.49≤(A/B)≤5. Therefore, the backlight module 50 in FIG. 7 may be used for uniformizing the brightness of display frames; and at the same time, reducing color caused by problems such as mura or blue light leakage.

Figure 9:
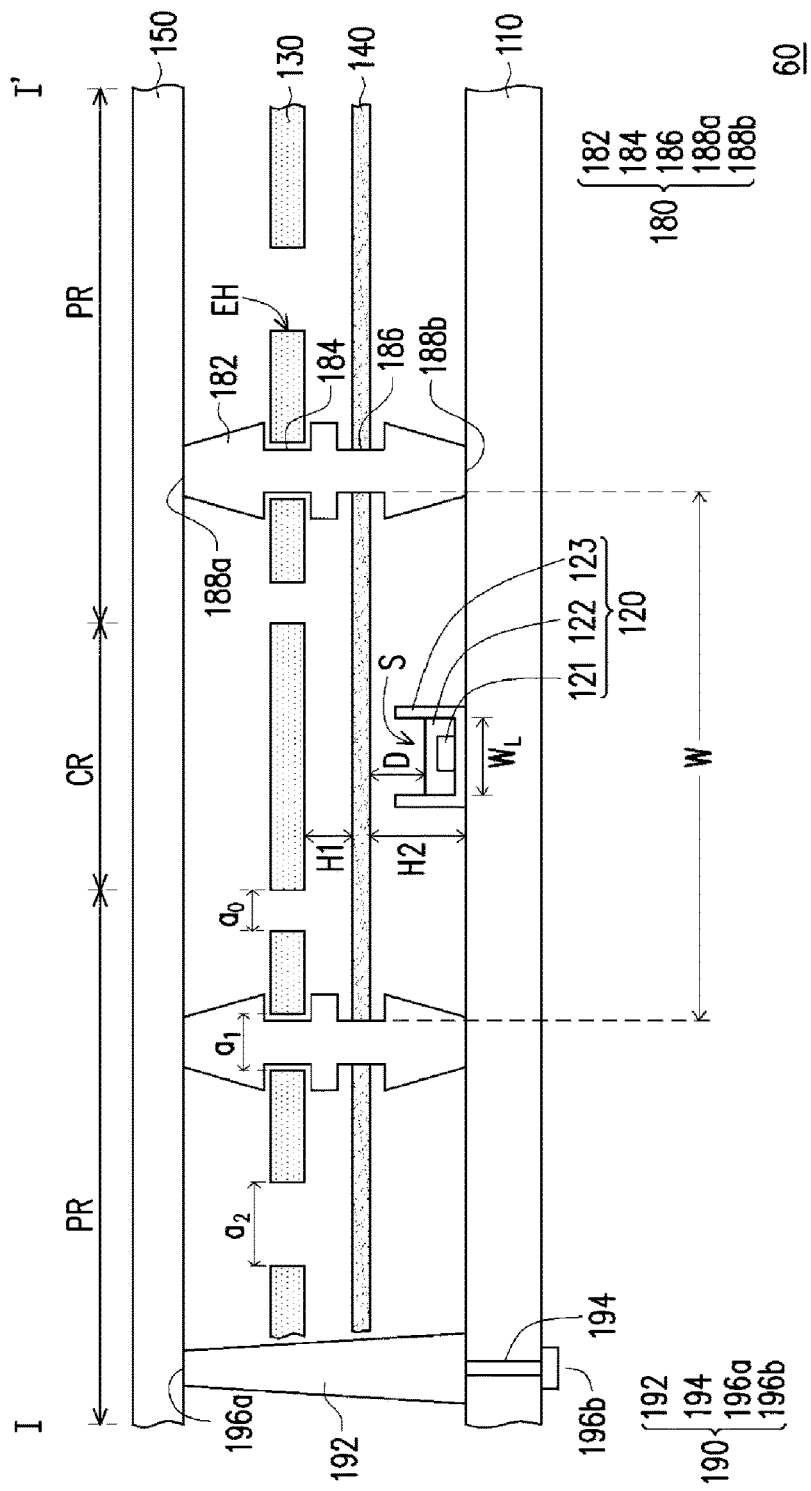
FIG. 9 is a partial schematic cross-sectional view of a backlight module according to another embodiment of the present invention.

FIG. 9 is a partial schematic cross-sectional view of a backlight module 60 according to another embodiment of the present invention. The backlight module 60 in FIG. 9 is similar to the backlight module 50 in FIG. 7; the same or similar elements are indicated by the same or similar reference numerals and they will not be described again herein. The difference between the structure of the embodiment in FIG. 9 and the structure of the embodiment in FIG. 7 lies in that the second clamping portion 186 of the first supporting pin 182 in FIG. 9 clamps the wavelength conversion optical layer 140. As shown in FIG. 9, the first clamping portion 184 of the first supporting member 180 in the present embodiment clamps the porous optical film 130; the second clamping portion 186 clamps the wavelength conversion optical layer 140. The wavelength conversion optical layer 140 is disposed above the light source 120, and is located between the light source 120 and the porous optical film 130.

Figure 10A:
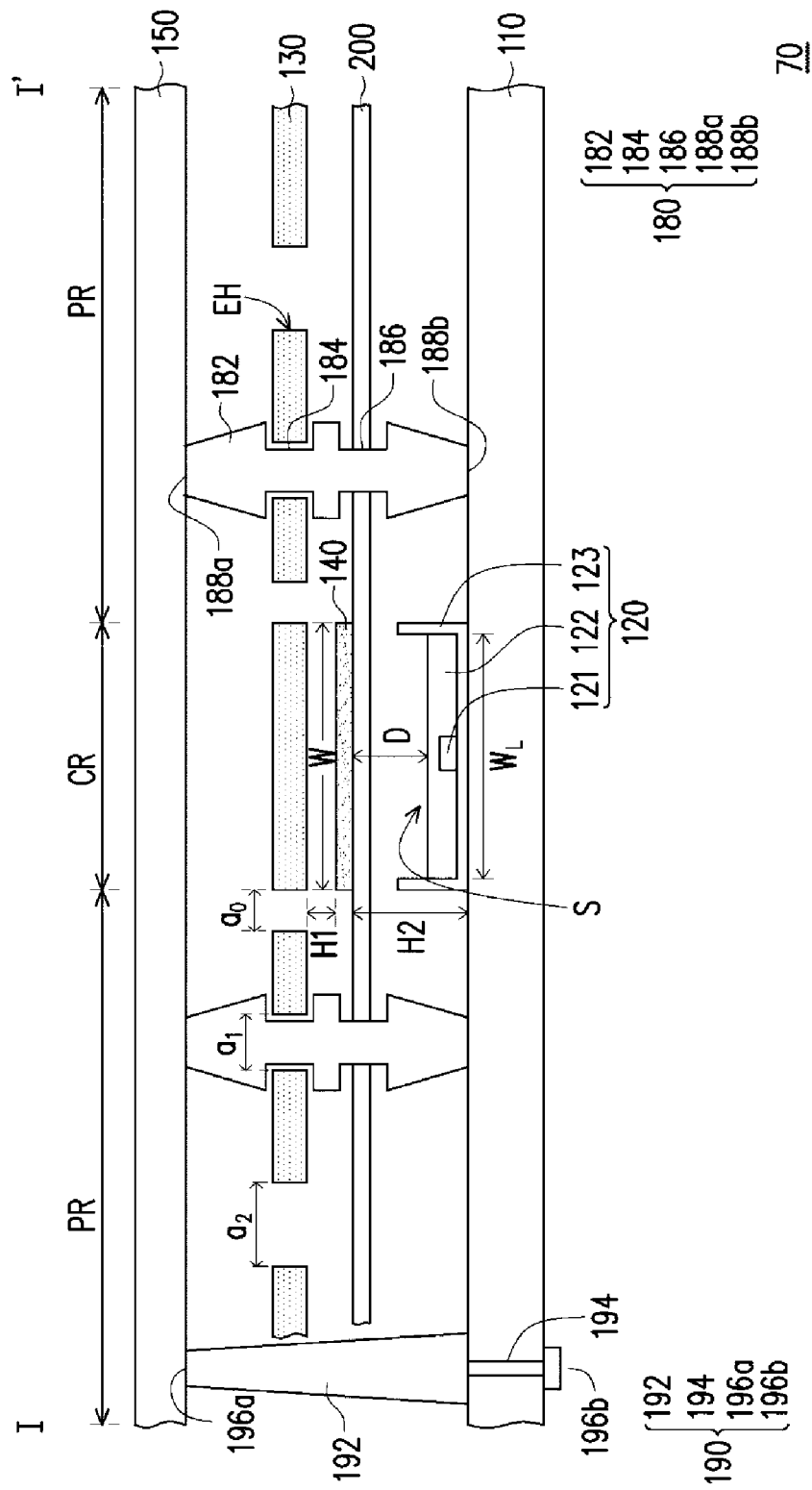
FIG. 10A and FIG. 10B are partial schematic cross-sectional views of a backlight module according to another embodiment of the present invention.
Figure 10B:
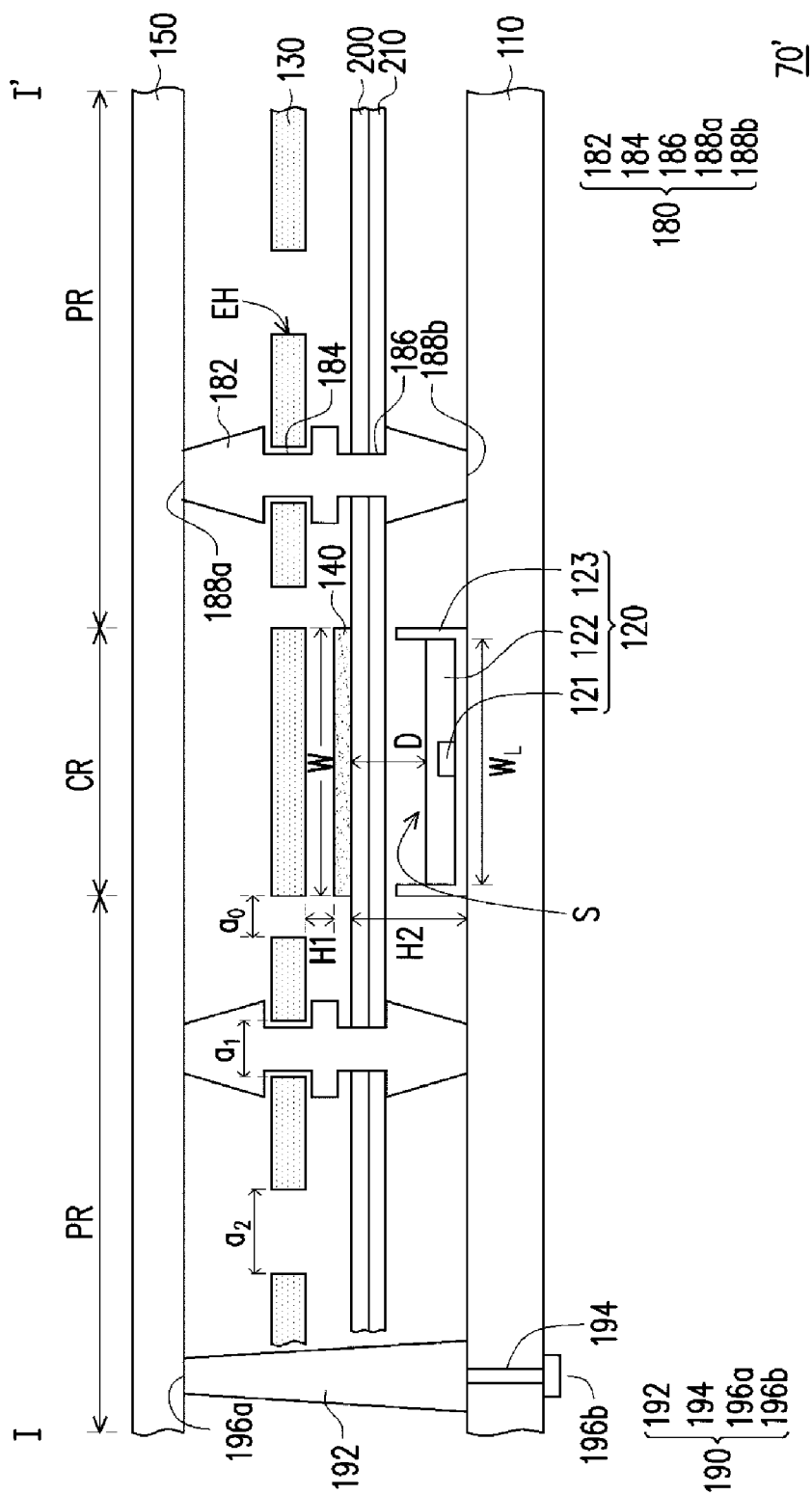

FIG. 10A and FIG. 10B are partial schematic cross-sectional views of a backlight module 70 according to another embodiment of the present invention. The backlight module 70 in FIG. 10A is similar to the backlight module 50 in FIG. 7; the same or similar elements are indicated by the same or similar reference numerals and they will not be described again herein. The difference between the structure of the embodiment in FIG. 10A and the structure of the embodiment in FIG. 7 lies in that the backlight module 70 in FIG. 10A further includes a light transmitting plate 200, wherein the second clamping portion 186 of the first supporting pin 182 clamps the light transmitting plate 200, and the light transmitting plate 200 carries the wavelength conversion optical layer 140. In other words, the wavelength conversion optical layer 140 is located between the light transmitting plate 200 and the porous optical film 130; and the light transmitting plate 200 is located between the light source 120 and the wavelength conversion optical layer 140.

In addition, the backlight module 70 may further selectively include a heat insulation layer 210. The heat insulation layer 210 is disposed on the light transmitting plate 200, facing the light source 120, for example, the backlight module 70' shown in FIG. 10B. That is, the disposition sequence is the wavelength conversion optical layer 140, followed by the light transmitting plate 200 and the heat insulation layer 210; but the present invention is not limited thereto. The disposition positions of the wavelength conversion optical layer 140, the heat insulation layer 210, and the light transmitting plate 200 may be replaced with one other. For example, the disposition sequence may be any of the following: the wavelength conversion optical layer 140, followed by the heat insulation layer 210 and the light transmitting plate 200; the heat insulation layer 210, followed by the light transmitting plate 200 and the wavelength conversion optical layer 140; the light transmitting plate 200, followed by the wavelength conversion optical layer 140 and the heat insulation layer 210, or the like.

Figure 11:
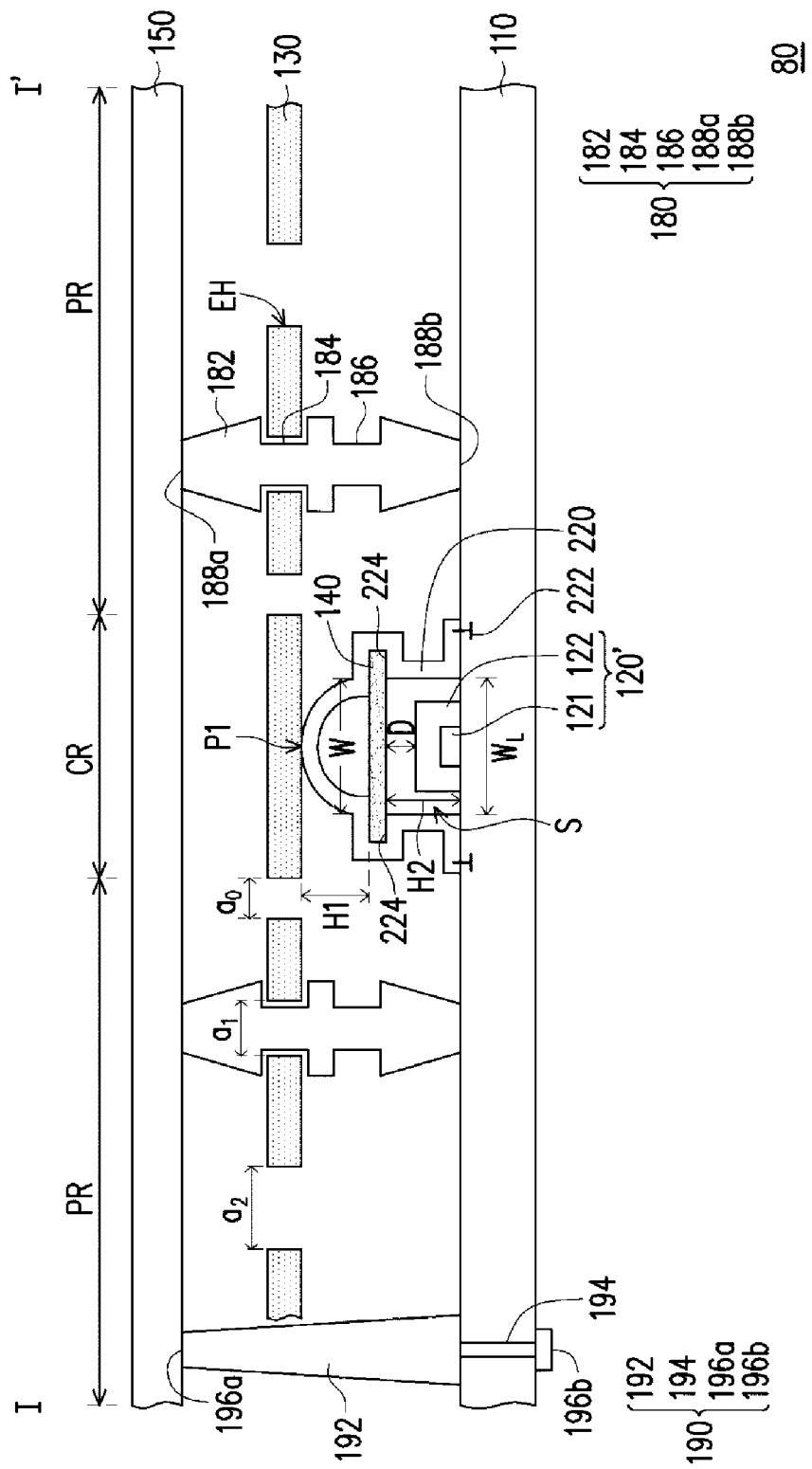
FIG. 11 is a partial schematic cross-sectional view of a backlight module according to another embodiment of the present invention.

FIG. 11 is a partial schematic cross-sectional view of a backlight module 80 according to another embodiment of the present invention. The backlight module 80 in FIG. 11 is similar to the backlight module 50 in FIG. 7; the same or similar elements are indicated by the same or similar reference numerals and they will not be described again herein. The difference between the structure of the embodiment in FIG. 11 and the structure of the embodiment in FIG. 7 lies in that the backlight module 80 in FIG. 11 further includes a curved support 220; and a light source 120' is used in place of the light source 120. As shown in FIG. 11, two ends of the curved support 220 are fixed on the substrate 110 through fixing portions 222, and are located on two sides of the light source 120', acting like an arch bridge spanning the light source 120'; and the curved support 220 has two fitting portions 224. In the present embodiment, the wavelength conversion optical layer 140 is fitted in the fitting portions 224 of the curved support 220, so that the wavelength conversion optical layer 140 is disposed above the light source 120'; a distance D exists between the wavelength conversion optical layer 140 and the packaging adhesive 122 of the light source 120'; a vertex P1 of the curved support 220 supports the porous optical film 130. Therefore, the wavelength conversion optical layer 140 is located between the light source 120' and the porous optical film 130. In an embodiment, a material of the curved support 220 is, for example, a material having high transparency.

Figure 12:
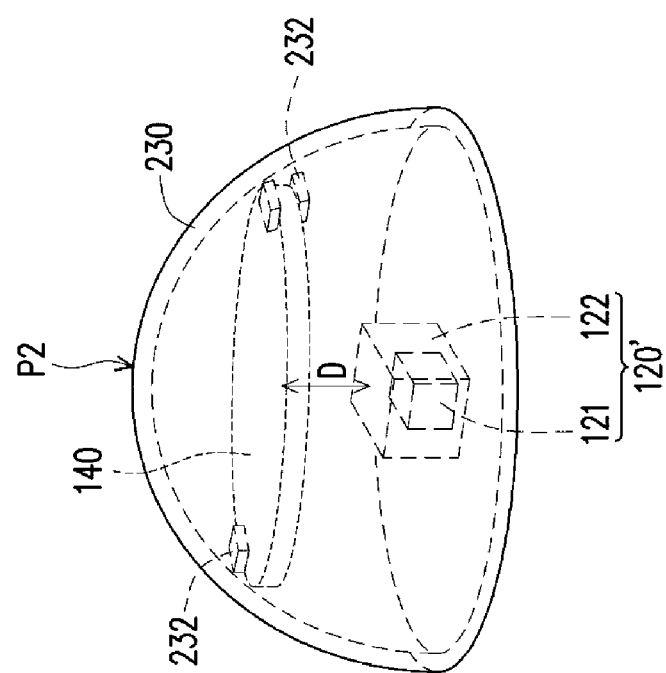
FIG. 12 is a partial three-dimensional schematic view of a backlight module according to an embodiment of the present invention.

However, the present invention is not limited thereto, and the curved support 220 in the backlight module 80 shown in FIG. 11 may, for example, be replaced by a semicircular hood 230 (referring to FIG. 12). Specifically, like the configuration of the curved support 220, the semicircular hood 230 shown in FIG. 12 is disposed on the substrate 110 and covers the light source 120'. The semicircular hood 230 also has two fitting portions 232 for fitting the wavelength conversion optical layer 140 therein, so that the wavelength conversion optical layer 140 is disposed above the light source 120'. A distance D exists between the wavelength conversion optical layer 140 and the packaging adhesive 122 of the light source 120'. Moreover, the semicircular hood 230 also has a vertex P2 for supporting the porous optical film 130. Therefore, the wavelength conversion optical layer 140 is located between the light source 120' and the porous optical film 130. In an embodiment, a material of the semicircular hood 230 is, for example, a material having high transparency.

Similar to the backlight module 50 in FIG. 7 and as described above, the top end 188a and the bottom end 188b of the first supporting pin 182 in the backlight modules in FIG. 9 to FIG. 12 are not fixed on the diffusion film 150 and the substrate 110. Within this structure, when the backlight modules in the foregoing embodiments are in a high-temperature and high-humidity environment, even with slight deformation, the porous optical film 130 still does not bend (shrink) because of the sliding of the first supporting member 180; Moreover, by reducing contact friction areas between the top end 188a and the bottom end 188b of the first supporting pin 182 and the diffusion film 150 and the substrate 110 respectively and selecting a material having lower rigidity to form the top end 188a and the bottom end 188b of the first supporting pin 182, element loss of the backlight module caused by friction between the first supporting member 180 and other elements can be effectively reduced.

In addition, the wavelength conversion optical layer 140 in the backlight modules of FIG. 9 to FIG. 12 has a width W; the accommodation space S has a width $W_L$, and 1≤(W/WL)<6. The backlight modules in the foregoing embodiments, therefore, not only can effectively reduce a disposition area of the wavelength conversion optical layer 140 and thus to lower manufacturing costs, but it can also reduce blue light leakage and so on. In addition, a distance D exists between the packaging adhesive 122 of the light source 120/120' and the wavelength conversion optical layer 140, and 10 mm>D≥0.75 mm. With the distance of the gap, not only that the backlight modules in the foregoing embodiments keep a thin appearance, but they also reduce the influence of the heat generated by the light source 120 on the wavelength conversion optical layer 140, thereby prolonging the service life of the wavelength conversion optical layer 140 and reducing heat degradation. In addition, a distance H1 exists between the wavelength conversion optical layer 140 and the porous optical film 130; and a distance H2 exists between the wavelength conversion optical layer 140 and the substrate 110, and 0<(H1/H2)<6, a maximum of a sum of H1 and H2 is 10 mm, and H1 is cannot be 0. Therefore, the backlight modules in the foregoing embodiments not only have a thin appearance but also achieve a desirable light mixing effect. It should be noted that an area of the central region CR of the porous optical film 130 in the backlight modules in FIG. 8 to FIG. 11 is A; and a vertical projection area of the wavelength conversion optical layer 140 is B, wherein the following condition is satisfied: 0.49≤(A/B)≤5. Therefore, the backlight modules in FIG. 9 to FIG. 12 may be used for uniformizing the brightness of display frames; and at the same time, reducing non-uniform color caused by problems such as mura or blue light leakage.

FIG. 13 is a schematic top view of a light source matrix LM and a wavelength conversion optical layer of a backlight module according to an embodiment of the present invention. The backlight module of the present invention substantially includes multiple light sources LS arranged on the substrate 110 to form the light source matrix LM. Moreover, in the present embodiment, the wavelength conversion optical layer is, for example, designed with multiple wavelength conversion optical layers 140, wherein each wavelength conversion optical layer 140 is disposed correspondingly to one light source LS of the light source matrix LM. In order to clearly describe the light source matrix LM in the present embodiment, FIG. 13 only depicts a light source matrix LM having 2×3 light sources LS; yet a person of ordinary skill in the art should understand that the light source matrix LM in FIG. 13 is actually constructed by arrays formed through arrangements of multiple light sources LS and can be applied to the backlight modules in the foregoing embodiments.

Please refer to FIG. 13. Multiple light sources LS are disposed on the substrate 110; each light source LS corresponds to one wavelength conversion optical layer 140. The light sources LS and the wavelength conversion optical layers 140 are arranged in arrays in a first direction X and a second direction Y. In the first direction X, the wavelength conversion optical layer 140 has a length B1. A distance between two adjacent wavelength conversion optical layers 140 is B3; and a distance between two adjacent light sources 120 is B7. In the second direction Y, the wavelength conversion optical layer 140 has a length B2. A distance between two adjacent wavelength conversion optical layers 140 is B4; and a distance between two adjacent light sources LS is B8. The light source matrix LM satisfies conditions such as B7>B8, B1>B2, B4≥B2, and (B1/B3)≥(B2/B4). A desirable light mixing effect for color conversion is therefore attainable. Such a design also greatly reduces a distribution area of the wavelength conversion optical layers 140 and thus lowering manufacturing costs.

In addition, the configuration of the light source matrix LM (i.e., B1+B3=B7 and B2+B4=B8) and the disposition of the emission structures EH of the porous optical film 130 (not depicted) that corresponds to B7 and B8 effectively improve the uniformity of surface emission. More specifically, an aperture length of the emission structures EH in the first direction X is greater than that of the emission structures EH in the second direction Y (i.e., B7>B8).

In view of the above, the backlight module of the present invention includes the porous optical film having the area A of the central region and the wavelength conversion optical layer having the vertical projection area B, wherein the condition 0.49≤A/B≤5 is satisfied, so that brightness uniformity of display frames can be improved. In addition, the first supporting pin in the backlight module is not fixed on the diffusion film and the substrate. Therefore, when the backlight module is in a high-temperature and high-humidity environment, even with slight deformation, the porous optical film still does not bend (shrink) because of the sliding of the first supporting member. Moreover, by reducing contact friction areas between the first supporting pin and the substrate and selecting a material having lower rigidity to form the first supporting pin, element loss of the backlight module caused by friction between the first supporting member and other elements can be effectively reduced.

Even though the present invention has been disclosed with the above-mentioned embodiments, it is not limited thereto. Any person of ordinary skill in the art may make some changes and adjustments without departing from the spirit and scope of the present invention. Therefore, the scope of the present invention is defined in view of the appended claims.

What is claimed is:

1. A backlight module, comprising:
   a substrate;
   a light source, located on the substrate;
   a porous optical film, disposed above the light source and having a plurality of emission structures, wherein the porous optical film distributes light generated by the light source to be emitted through the emission structures located at different positions; the porous optical film has a central region and a peripheral region surrounding the central region; the central region is disposed corresponding to the light source, and an area of the central region is A; wherein the plurality of emission structures are only located in the peripheral region; and
   a wavelength conversion optical layer, located between the light source and the porous optical film, wherein a vertical projection area of the wavelength conversion optical layer is B, and wherein 0.49<=A/B<=5.

2. The backlight module according to claim 1, wherein a vertical distance between the porous optical film and the wavelength conversion optical layer is H1; a vertical distance between the wavelength conversion optical layer and the substrate is H2, 0<H1/H2<6, and H1≠0.

3. The backlight module according to claim 1, wherein a distance between the wavelength conversion optical layer and the light source is D, and 10 mm>D≥0.75 mm.

4. The backlight module according to claim 1, further comprising a supporting frame, wherein the supporting frame is disposed on the substrate and surrounds the light source, and the supporting frame carries the wavelength conversion optical layer.

5. The backlight module according to claim 1, further comprising at least one first supporting member disposed on the substrate and located on both sides of the light source, wherein the first supporting member has a first supporting pin; the first supporting pin has a first clamping portion and a second clamping portion; and a top end and a bottom end of the first supporting pin abut against a diffusion film and the substrate respectively.

6. The backlight module according to claim 5, wherein the first clamping portion clamps the porous optical film, and the second clamping portion clamps the wavelength conversion optical layer.

7. The backlight module according to claim 5, wherein the first clamping portion clamps the porous optical film, the second clamping portion clamps a light transmitting plate; and a first side of the light transmitting plate carries the wavelength conversion optical layer.

8. The backlight module according to claim 7, wherein a heat insulation layer is disposed at a second side of the light transmitting plate opposite to the wavelength conversion optical layer, and the heat insulation layer faces the light source.

9. The backlight module according to claim 5, wherein the first supporting pin is spindle-shaped.

10. The backlight module according to claim 5, further comprising at least one second supporting member disposed on the substrate, wherein the second supporting member has a second supporting pin; a top end of the second supporting pin abuts against the diffusion film; a bottom end of the second supporting member has a third clamping portion, and the third clamping portion clamps the substrate.

11. The backlight module according to claim 1, further comprising a curved support, wherein two ends of the curved support are fixed on the substrate and located on two sides of the light source; a vertex of the curved support supports the porous optical film; the curved support has two fitting portions, and the wavelength conversion optical layer is fitted in the fitting portions.

12. The backlight module according to claim 1, further comprising a semicircular hood, wherein the semicircular hood covers the light source; a vertex of the semicircular hood supports the porous optical film; the semicircular hood has two fitting portions, and the wavelength conversion optical layer is fitted in the fitting portions.

13. The backlight module according to claim 1, wherein the light source comprises:

a cup-shaped structure, disposed on the substrate and having an accommodation space;
a blue light chip, disposed within the accommodation space; and
a packaging adhesive, covering and packaging the blue light chip,
wherein the wavelength conversion optical layer is disposed on the cup-shaped structure; the wavelength conversion optical layer closes an opening of the accommodation space, and a gap is provided between the packaging adhesive and the wavelength conversion optical layer.

14. The backlight module according to claim 1, wherein the light source comprises:

a lens, disposed on the substrate and forming an accommodation space; and
a blue light chip, disposed within the accommodation space;
wherein the lens has a recess at a position corresponding to the blue light chip, and the recess accommodates the wavelength conversion optical layer.

15. The backlight module according to claim 1, wherein the light source comprises multiple light sources, the wavelength conversion optical layer comprises multiple wavelength conversion optical layers, and each wavelength conversion optical layer is disposed corresponding to one of the light sources for forming an array arranged in an X direction and a Y direction, wherein a width of each wavelength conversion optical layer in the X direction is $B1$;
a width of each wavelength conversion optical layer in the Y direction is $B2$;
a distance between two adjacent wavelength conversion optical layers in the X direction is $B3$;
a distance between two adjacent wavelength conversion optical layers in the Y direction is $B4$;
a distance between two adjacent light sources in the X direction is $B7$;
a distance between two adjacent light sources in the Y direction is $B8$; and
$B7>B8$, $B1>B2$, $B4 \geq B2$, and $(B1/B3) \geq (B2/B4)$.

* * * * *